A. W. JACKSON.
Steam Engine.
No. 118,133.            Patented August 15, 1871.
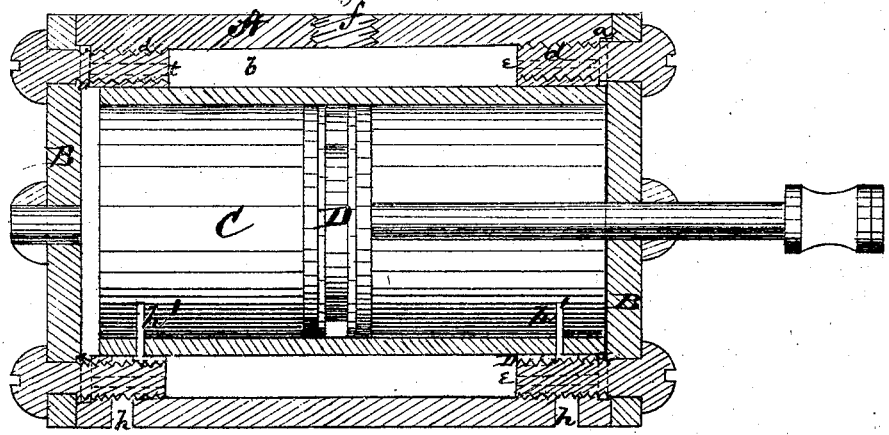
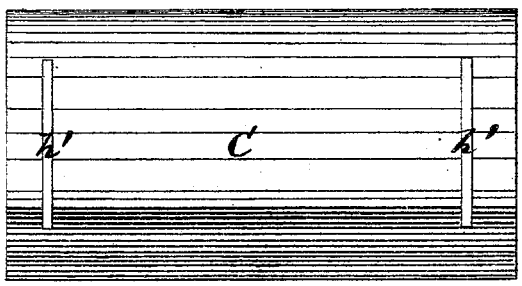
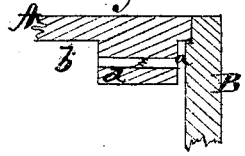
Witnesses          Inventor
Jas. E. Hutchinson     Amariah W. Jackson.
C. L. Evert.         per Alexander Mason
                         Attys.

UNITED STATES PATENT OFFICE.

AMARIAH W. JACKSON, OF NAPOLEON, OHIO.

IMPROVEMENT IN STEAM-ENGINES.

Specification forming part of Letters Patent No. 118,133, dated August 15, 1871.

*To all whom it may concern:*

Be it known that I, AMARIAH W. JACKSON, of Napoleon, in the county of Henry and in the State of Ohio, have invented certain new and useful Improvements in Steam-Engine; and do hereby declare that the following is a full, clear, and exact description thereof, reference being had to the accompanying drawing and to the letters of reference marked thereon making a part of this specification.

The nature of my invention consists in the construction and arrangement of a steam-engine, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my engine. Fig. 2 is a side view of an interior movable sleeve, and Fig. 3 is a section of one end of the cylinder through one of the steam-inlet ports.

A represents the cylinder closed by heads B B in the usual manner. At each end of the cylinder A, immediately inside of the head, is a circumferential recess or groove, $a$, and around the inside of the cylinder is a chamber, $b$, leaving a solid ring, $d$, between each end of said chamber and the recess $a$. Through these rings $d$ $d$ are steam-passages $e$ $e$ to admit the steam from the chamber to the grooves, the steam entering said chamber through the steam-inlet $f$. On one side of the cylinder A, at each end, is an exhaust-port, $h$, which passes through the solid ring $d$, as shown in Fig. 1. C represents a hollow sleeve fitted to the bore of the cylinder A and about one-fourth of an inch shorter than the same, the so-called rings $d$ $d$ forming the bearings for said sleeve. This sleeve is near each end provided with an exhaust-port, $h'$. D represents the piston, made in any of the known and usual ways to fit the sleeve C. The friction of the piston moves the sleeve in the same direction the piston is traveling, cutting off the steam alternately, and at the same time opening for the induction of steam at the opposite end.

Having thus fully described my invention, what I claim as new, and desire to secure by Letters Patent, is—

1. The sleeve C, open at both ends, fitted within a steam-engine cylinder, A, and operated by means of the friction of the piston D, all constructed substantially as and for the purposes herein set forth.

2. The combination of the sleeve C, open at both ends, and with openings $h'$ $h'$ with the cylinder A, provided with grooves $a$ $a$, chamber $b$, bearings $d$ $d$, and its passages and ports, and the piston D, all constructed and arranged to operate substantially as herein set forth.

In testimony that I claim the foregoing I have hereunto set my hand this 1st day of July, 1871.

A. W. JACKSON.

Witnesses:
C. L. EVERT,
A. N. MARR.